United States Patent
Fuller et al.

(10) Patent No.: US 11,593,884 B2
(45) Date of Patent: Feb. 28, 2023

(54) CONTROLLING PRICE CASCADE MOVEMENTS IN AN ELECTRONIC TRADING SYSTEM

(71) Applicant: LIFFE Administration and Management, London (GB)

(72) Inventors: Robert James Fuller, London (GB); Steven John Katesmark, London (GB); Christopher Roy Harrison, London (GB)

(73) Assignee: LIFFE Administration and Management, London (GB)

( * ) Notice: Subject to any disclaimer, the term of this patent is extended or adjusted under 35 U.S.C. 154(b) by 0 days.

(21) Appl. No.: 17/897,849

(22) Filed: Aug. 29, 2022

(65) Prior Publication Data

US 2022/0414776 A1    Dec. 29, 2022

Related U.S. Application Data

(60) Continuation of application No. 17/532,530, filed on Nov. 22, 2021, now Pat. No. 11,461,846, which is a continuation of application No. 17/231,622, filed on Apr. 15, 2021, now Pat. No. 11,216,883, which is a continuation of application No. 16/506,536, filed on Jul. 9, 2019, now Pat. No. 11,010,835, which is a continuation of application No. 15/918,494, filed on Mar. 12, 2018, now Pat. No. 10,387,956, which is a
(Continued)

(51) Int. Cl.
*G06Q 40/06* (2012.01)
*G06Q 40/04* (2012.01)

(52) U.S. Cl.
CPC ............. *G06Q 40/04* (2013.01); *G06Q 40/06* (2013.01)

(58) Field of Classification Search
CPC ............................... G06Q 40/04; G06Q 40/06
See application file for complete search history.

(56) References Cited

U.S. PATENT DOCUMENTS 7,464,055 B2    12/2008  Kelly et al.
7,698,187 B2    4/2010   Huizing et al.
(Continued)

FOREIGN PATENT DOCUMENTS

JP    2001-283005 A       10/2001
KR    20-2009-0009300 U    9/2009
(Continued)

OTHER PUBLICATIONS

C. L. Osler, Stop-loss orders and price cascades in currency markets, Jun. 2002, Federal Reserve, web, pp. 2-35 (Year: 2002).*
(Continued)

*Primary Examiner* — I Jung Liu
(74) *Attorney, Agent, or Firm* — DLA Piper LLP (US)

(57) ABSTRACT

A disclosed system, method and computer readable storage medium includes mechanism for controlling cascade price movements in an electronic trading system. Price limits control the prices at which traders can place orders. An upper price limit prevents traders from placing orders above the upper limit and a lower price limit prevents traders from placing orders below the lower limit. The gap between the upper limit and the indicative marked price as well as the gap between lower limit and the indicative market price is controlled so as to cause a breaking effect on very rapidly changing market price.

18 Claims, 11 Drawing Sheets

Related U.S. Application Data continuation of application No. 13/777,851, filed on Feb. 26, 2013, now Pat. No. 9,922,372, which is a division of application No. 12/611,781, filed on Nov. 3, 2009, now Pat. No. 8,417,619.

(56) References Cited

U.S. PATENT DOCUMENTS

| | | | |
|---|---|---|---|
| 7,797,220 B2 | 9/2010 | McIntyre | |
| 7,987,134 B1 | 7/2011 | Johnson | |
| 8,200,568 B2 * | 6/2012 | Renton | G06Q 40/04 705/37 |
| 8,306,900 B2 | 11/2012 | Bok et al. | |
| 8,392,311 B2 * | 3/2013 | Olsen | G06Q 40/00 705/37 |
| 8,898,080 B1 | 11/2014 | Nolan et al. | |
| 2001/0037204 A1 | 11/2001 | Hom et al. | |
| 2007/0038554 A1 | 2/2007 | Kemp, II et al. | |
| 2007/0100733 A1 | 5/2007 | Huizing et al. | |
| 2007/0208654 A1 | 9/2007 | Steams | |
| 2007/0244783 A1 | 10/2007 | Wright et al. | |
| 2008/0046356 A1 * | 2/2008 | Farrell | G06Q 40/04 705/37 |
| 2008/0114671 A1 | 5/2008 | Goel et al. | |
| 2008/0288391 A1 | 11/2008 | Downs et al. | |

FOREIGN PATENT DOCUMENTS

| | | | |
|---|---|---|---|
| WO | 01/35284 A1 | 5/2001 | |
| WO | 2011/148635 A1 | 12/2011 | |
| WO | WO-2011148635 A1 * | 12/2011 | G06Q 40/02 |

OTHER PUBLICATIONS

NYSE Euronext, Inc, "How the Liffe Markets Work: An Introduction to How the Liffe Markets Work, Detailing How Trading Takes Place on LIPFE CONNECT," 2007, 28 pages.

C. L. Osler, "Stop-Loss Orders and Price Cascades in Currency Markets," Jun. 2002, Federal Reserve, web, pp. 2-35.

Instinet staff, Algorithmic Trading An Overview: 2052 Instinet, web http://www.northinfo.com/documents/172.pdf, pp. 1-20.

Farmer, J. Doyne, et al., "What Really Causes Large Price Changes," Apr. 14, 2004, IP.com, web, pp. 1-2.

\* cited by examiner

| Price |
|---|
| 9546 |
| 9545 |
| 9544 |
| 9543 |
| 9542 |
| 9541 |
| 9540 |
| 9539 ⎤ Upper Limit 610 |
| 9538 |
| 9537 |
| 9536 ⎯ IMP 630 |
| 9535 |
| 9534 |
| 9533 ⎦ Lower Limit 640 |
| 9532 |
| 9531 |

FIG. 6

Price
9541
9540
9539 — Upper Limit 710
9538
9537
9536
9535
9534
9533 — IMP 730
9532
9531
9530 — Lower Limit 740
9529
9528
9527

FIG. 7

| Price | |
|---|---|
| 9541 | |
| 9540 | |
| 9539 | |
| 9538 | |
| 9537 | |
| 9536 | Upper Limit 810 |
| 9535 | |
| 9534 | |
| 9533 | |
| 9532 | |
| 9531 | |
| 9530 | IMP 830 |
| 9529 | |
| 9528 | Lower Limit 840 |
| 9527 | |

FIG. 8

| Price | |
|---|---|
| 9533 | |
| 9532 | Upper Limit 910 |
| 9531 | |
| 9530 | |
| 9529 | |
| 9528 | |
| 9527 | |
| 9526 | Lower Limit 940, IMP 930 |
| 9525 | |
| 9524 | |

FIG. 9

CONTROLLING PRICE CASCADE MOVEMENTS IN AN ELECTRONIC TRADING SYSTEM

BACKGROUND

1. Field of Art

The disclosure generally relates to the field of electronic trading systems and in particular to controlling price cascade movements in an electronic trading system.

2. Description of Art

An electronic trading system provides a central market place where both buyers and sellers (often referred to as traders) can buy/sell their preferred derivative instrument. Traders connect to the electronic trading system via an application program interface (API) which interprets messages from their own trading computers. Although all trading is executed electronically, the preferred trading strategies can vary greatly from one trader to another.

Electronic trading systems support a number of common order types that can be submitted into the market. Users of electronic trading systems incorporate these various orders into their trading strategies. Three types of most common orders are: limit orders, stop orders, and market orders (also referred to as "at market orders"). First, a limit order is an order to buy/sell a set number of contracts at a pre-determined price. A stop order is commonly understood to be an order to buy or sell a set number of contracts at the prevailing market price if and when a specified price is reached. Practically, the buyer or seller takes a view that if a certain price in the market was to trade or be broken (i.e., go beyond) then this would strongly indicate price direction.

The stop order was originally devised to protect against a loss (a stop loss) where a trader has a position and wants to reverse the position quickly. Over time the stop order has evolved to not only limit loss but to trade in a direction to make and/or take profits. Finally, a market order is an order to buy/sell a set number of contracts at the prevailing market price until the specified quantity has been met or the order cancelled. A market order has no price at which to trade just a quantity of lots. Specifically, the market order in layman's terms corresponds to "I don't care what price I trade at as long as I trade."

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 6-9 illustrate an embodiment of spiking price limits mechanism for controlling cascade price movements in an electronic trading system.

DETAILED DESCRIPTION

Figure 1:
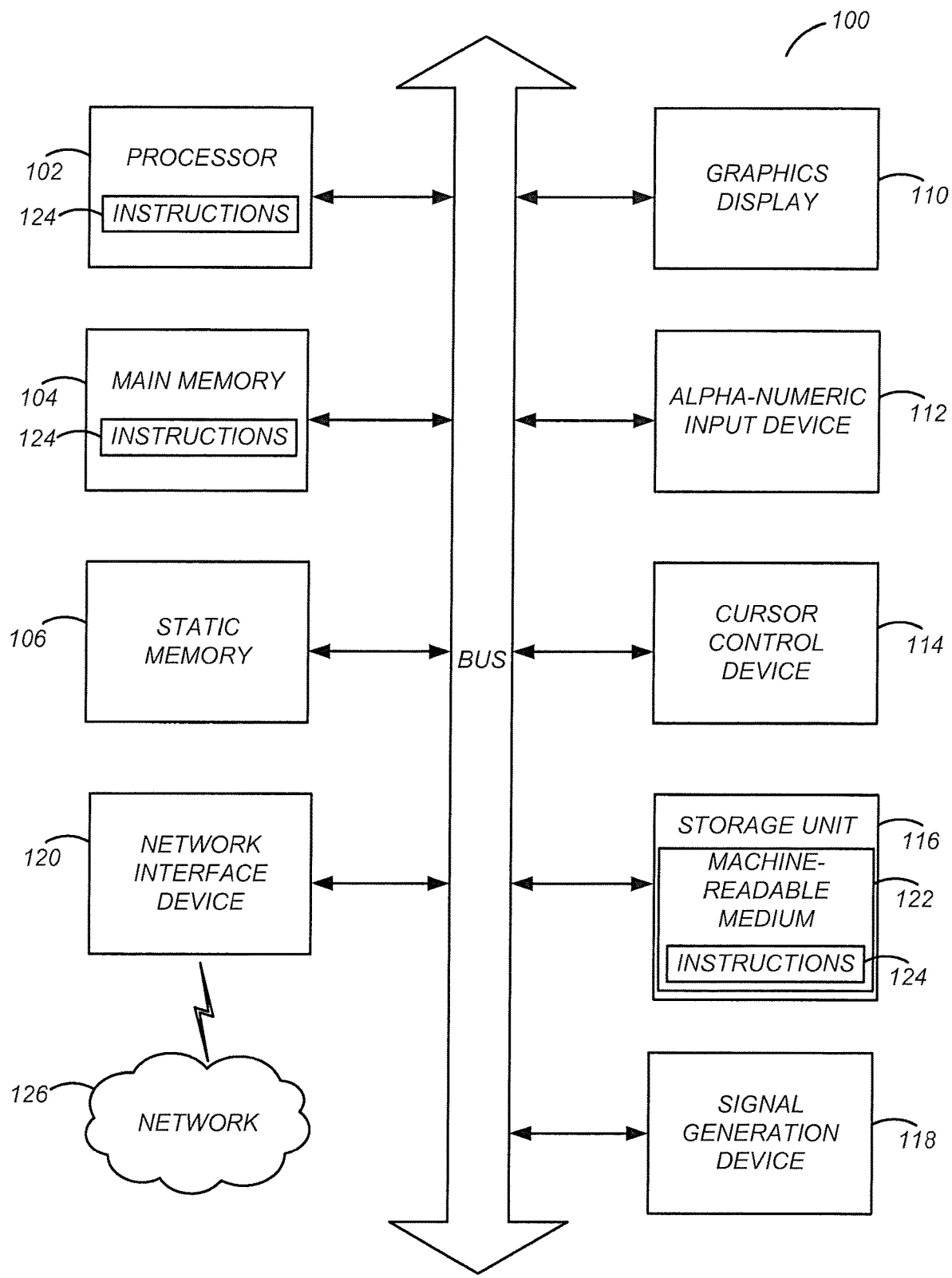
FIG. 1 illustrates one embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes mechanism for controlling cascade price movements in an electronic trading system. Price limits control the prices at which traders can place orders. An upper price limit prevents traders from placing orders above the upper limit and a lower price limit prevents traders from placing orders below the lower limit. The gap between the upper limit and the indicative market price (IMP) as well as the gap between lower limit and the indicative market price is controlled so as to cause a breaking effect on very rapidly changing market price.

In one embodiment, a price limits mechanism maintains a first limit and a second limit such that the indicative market price is between the first limit and the second limit. Any orders outside the range of the first limit and second limit are rejected. The value of the gap between the first limit and the IMP is maintained within a predetermined range of the gap between the second limit and the IMP. In one embodiment, the value of the gap between the first limit and the IMP is maintained equal to the gap between the second limit and the IMP in terms of numbers of ticks.

If the IMP is detected hitting the first price limits a predetermined number of times within a time interval of a predetermined size, the first limit is adjusted such that the gap between the second limit and the IMP is larger than the gap between the first limit and the IMP. The IMP hitting the first price limit a predetermined number of times within a time interval of a predetermined size is considered as a cascade price movement in the direction of the first limit. For example, if the first limit is a lower limit, the IMP value hitting the lower limit multiple times in a short time interval is considered a sign of a cascade price movement going down. Alternatively, if the first limit is the upper limit, the IMP value hitting the upper limit multiple times in a short time interval is considered a sign of a cascade price movement going up.

In an embodiment, after the limits are adjusted as described above to maintain a larger gap between the second price limit and IMP compared to the gap between the first price limit and IMP, further instances of IMP hitting the first limit are monitored. For example, if the IMP hits the first price limit again, the first gap between the first price limit and the IMP is reduced. Each time the IMP hits the first price limit subsequently, the first gap between the first price limit and the IMP is reduced until it reaches the value zero.

Since the gap between the lower limit and the IMP is reduced to zero, until the price limits mechanism is manually changed by a system administrator, the price limit cannot continue moving in the direction of the first limit. Movements of the IMP in the direction of the second limit are monitored. In an embodiment a significant move in the direction of the second limit is treated as a sign that the price has changed direction and is moving in the direction opposite of the cascade move. Accordingly, the price limits mechanism is changed back to maintaining the gap between the first limit and the IMP within a predetermined range of the gap between the second limit and the IMP, for example keeping the two gaps at the same number of ticks. In an embodiment, the significant move in the direction of the second limit is indicated by the IMP hitting the second limit.

In an embodiment, fixed price limits are enforced for a given time interval of trading in the market. An upper limit and a lower limit is associated with a given time interval. The upper and lower limits are maintained at the same price levels during the time intervals. No trades are executed outside the fixed price limits. The fixed price limits can be adjusted for a subsequent time interval. The fixed price limits for a given time interval may be determined based on information associated with the trading of the markets in previous time intervals. A cascade price movement in a particular direction stops when it hits the fixed price limit encountered in that direction.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Architecture

Figure 2:
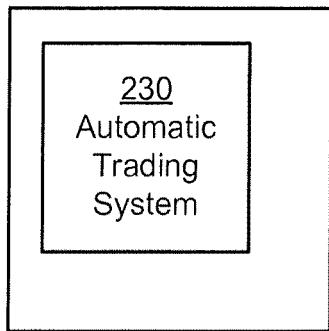
FIG. 2 illustrates one embodiment of a system environment for controlling cascade price movements in an electronic trading system.
Figure 2:
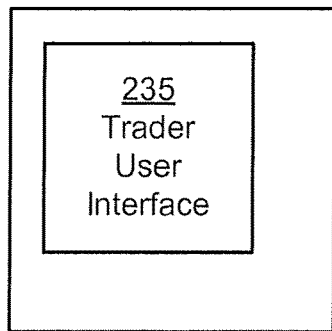
Figure 2:
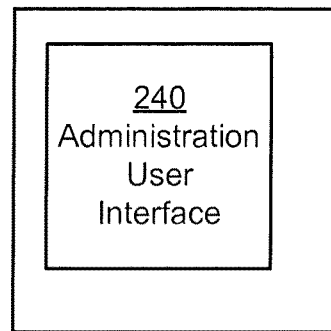
Figure 2:
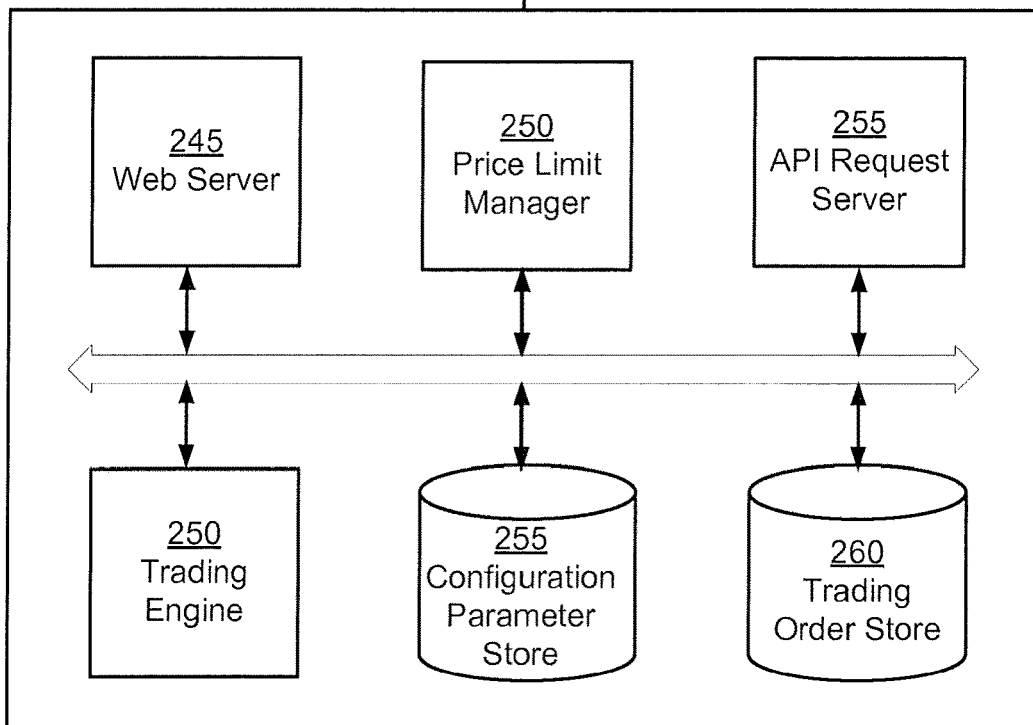

FIG. 2 is a system architecture diagram illustrating one embodiment of a system for controlling cascade price movements in an electronic trading system. The system environment comprises one or more client devices 205 for clients using automatic trading, one or client devices 215 for clients using manual trading, and one or more client devices 220 for system administrators.

The client devices 205, 215, and 220 comprise one or more computing devices that can receive user input and can transmit and receive data via the network 225. For example, the client devices may be desktop computers, laptop computers, smart phones, personal digital assistants (PDAs), or any other device including computing functionality and data communication capabilities. The client devices are configured to communicate via network 225, which may comprise any combination of local area and/or wide area networks, using both wired and wireless communication systems. The client devices 205, 215, and 220 send requests to the electronic trading system 200 via the network 225. The electronic trading system 200 takes appropriate action based on the request received. The different client devices and the modules in the client devices are described below. As used herein, the term "module" refers to a computer program logic and/or data for providing the specified functionality. A module can be implemented in hardware, firmware, and/or software. In alternative configurations, different and/or additional modules can be included in the corresponding client devices 205, 215, and 220.

The client device 215 includes a trader user interface 235 to allow a trader to do manual trading. Some traders use the computer's automated functions sparingly. These traders prefer to trade manually using the mouse to "point and click" at the price on their screens that they seek to buy and/or sell, taking a medium to long term view on market direction. The orders placed by the traders cause the trader user interface 235 to send a request to the electronic trading system 200.

The client device 205 includes an automatic trading system 230 for use by the traders. The automatic trading systems 230 are used by traders that prefer to use a computerised mathematical trading algorithm to place, buy and sell orders for them. This group of traders is known in the industry by a number of names: automated price injection model users (APIMs), black box and algorithmic or "algo" traders (collectively automated order entry (AOE) users). The advantage the AOE user has over the point and click traders is speed. Since there is no human interaction involved in the trading decisions, the AOE reaction time is extremely fast; trading in this configuration can be measured in thousandths of a second. Therefore, AOEs can trade many times within a second, thereby placing enormous pressure on the associated technical infrastructures.

The client device 220 includes an administration user interface 240 to allow the system administrator to perform administrative tasks for the electronic trading system 200. These tasks include configuring parameters for various modules in the electronic trading system 200, starting and stopping specific components of the electronic trading system 200, and monitoring the performance of the electronic trading system 200.

The electronic trading system 200 comprises a web server 245, a price limit manager 250 an API request server 255, a trading engine 250, a configuration parameter store 255, and a trading order store 260. The trading order store 260 stores the orders placed by traders and historical data related to orders previously executed. The configuration parameter store 255 stores configuration parameters related to various components including the price limit manager.

The API request server allows automatic trading systems 230 to send requests to the electronic trading system 200, for example, for placing orders. The web server 245 processes requests sent by the trader user interface 235 and by the administrator user interface 240. In an embodiment, the web server 245 can also process requests sent by the automatic trading system 230. The web server 245 can serve web pages, as well as other web-related content, such as Java, Flash, XML, and so forth. The web server 245 may include a mail server or other messaging functionality for receiving and routing messages between the electronic trading system 200 and the client devices 205, 215, and 220. For example, the web server may route alerts to a system administrator using the administration user interface to alert the system administrator about the health of the system.

The trading engine 250 executes orders placed by traders. The price limit manager 250 maintains upper and lower price limits that control the prices at which traders can place orders. For example, in an embodiment, the trading engine inspects orders available in the trading order store 260 and determines the orders that can be executed. If an order is executed, the status of the order in the trading order store 260 is updated. In an embodiment, the trading engine 250 uses price limits set by the price limit manager to determine whether to execute an order or reject the order. For example, orders received outside the upper and lower limits are rejected whereas orders received within the upper and lower limits are allowed to execute. The price limit manager 250 determines price limits based on configuration parameters stored in the configuration parameter store 255. The configuration parameters stored in the configuration parameter store 255 can be updated by a system administrator using the administration user interface 240. In an embodiment, the configuration parameters may be updated automatically based on market conditions, for example, volatility of the market.

Price Limits to Guard Against Errors Configuration

A price limits mechanism guards against manifest errors on order entry. The price limits mechanism generally and frequently protects member firms using the electronic trading system 200 and the market as a whole from keying errors that inevitably occur from time to time in an automated market. An electronic trading system continuously generates price limits in real-time, and rejects orders submitted outside the limits (i.e. bids at a price above the upper price limit and offers at a price below the lower price limit). In one embodiment, the price limits mechanism is configured as computer program instructions 124 (software), stored in the memory 104 and/or the machine readable unit 122 in the storage unit 116 and executable by the processor 102.

For futures products, the price limits in the most active contract month (also referred to as the "blue month") operate on the basis of a number of ticks either side of the last traded price (or subsequent offers below/bids above that price). A tick corresponds to a standardized minimum price movement of a futures or options contract. For all other contract months, price limits operate on the basis of a number of ticks either side of the fair value for that month, with the fair value level being calculated by the system in real-time from outright and implied spread prices available in the market. By taking their lead from the most liquid "blue month", the price limits in the other months remain up to date, and therefore do not interrupt normal trading. The number of ticks (or "price limit spread") is configurable by contract month, and can be adjusted as necessary to reflect market conditions (e.g. widened ahead of a major economic announcement, such as the announcement of the Federal Reserve or an appropriate authority changing key interest rates).

For option products, the electronic exchange calculates a theoretical fair value price for each series. The fair value will generate a spread, the range of which is determined from the applicable option delta value. The spread range is then employed by electronic exchange as the price limit for the option series concerned. Orders entered at price levels outside the price limits will be automatically prevented from trading by the electronic exchange and the relevant trader will be electronically notified immediately that the order has been rejected.

Figure 3:
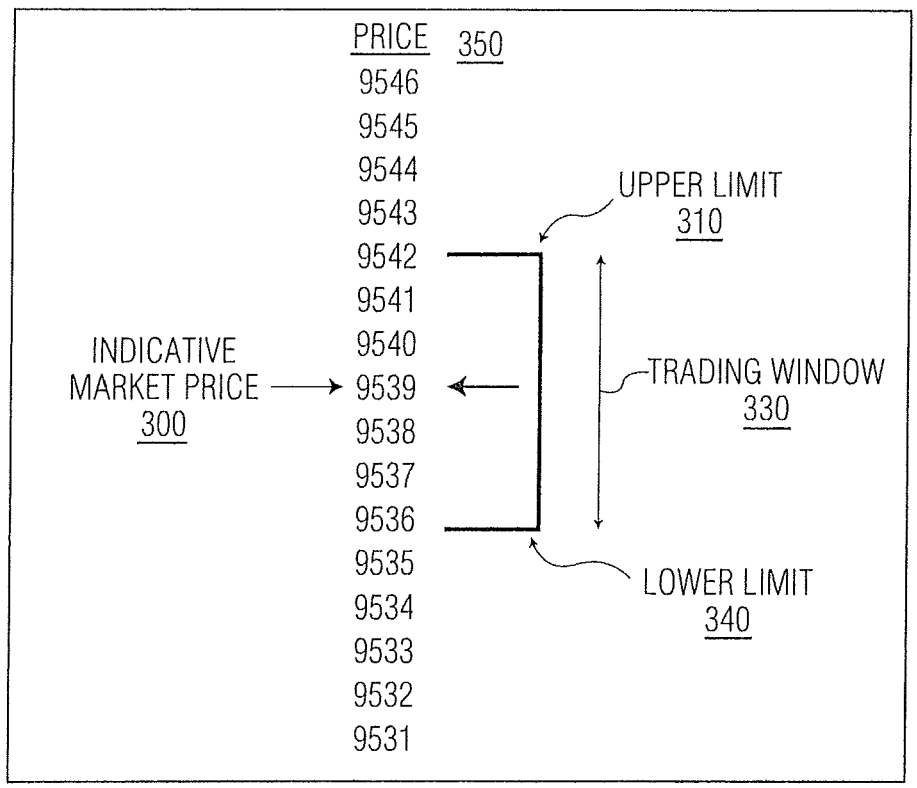
FIG. 3 illustrates an embodiment of price limits mechanism in an electronic trading system including an upper limit and a lower limit.

FIG. 3 illustrates the price limits mechanism in an electronic trading system including an upper limit 310 and a lower limit 340. An upper limit 310 sets the highest price the contract can trade up to, driven by just one order. The upper limit 310 is also the highest price a bid can be submitted at. A lower limit 340 sets the lowest price the contract can trade down to, driven by just one order, also the lowest price an offer can be submitted. A trading window 330 is the range between the upper and lower limits. An indicative market price (IMP) 300 follows the most recent event which could be; the last trade, bid above the last trade, or offer below the last trade.

The price limits mechanism illustrated in FIG. 3 (also referred to as the normal price limits mechanism) on the electronic trading system 200 tracks the indicative market price as it moves. The indicative market price 300 can be calculated using: last trade or bid above last trade or offer below last trade. In FIG. 3 the indicative market price 300 has value 9539 with the price limits set to 3 points or ticks. Accordingly the upper limit 310 is 3 ticks above the IMP at 9542 and the lower limit 340 is 3 ticks below the IMP at 9536. That is, the gap between the upper limit 310 and the IMP is 3 ticks and similarly the gap between the lower limit and the IMP is also 3 ticks. In an embodiment, the IMP is maintained as the average value of the upper limit and the lower limit. Accordingly the gap between the upper limit and the IMP equals the gap between the lower limit and the IMP.

In another embodiment, the gap between the upper limit and the IMP can be within a predetermined range of the gap between the lower limit and IMP. For example, the gap between the upper limit and the IMP can be within one tick of the gap between the lower limit and IMP allowing the upper limit to be 5 ticks above IMP while the lower limit is 4 ticks below the IMP. As shown in FIG. 3, a buy order up to the price of 9542 (the upper limit 310) and a sell order down to the price of 9536 (the lower limit 340) will be accepted. A buy order above 9542 or a sell order below 9536 will be rejected. The only exception to this is a market order.

If a large market sell order arrives in the market it could drive the indicative market prices down to the lower price limit. If multiple market sell orders arrive at the same time it can produce a cascade. A cascade is a chain reaction of one market order triggering another market order triggering another and so on. A cascade can have a significant impact on a market partly due to the speed it happens. This is due to the fact that the stop order function has been automated by the traders not dissimilar from the aforementioned AOEs. A cascade can move a market price a considerable distance in seconds. All automated electronic markets are impacted by cascades, and conventional electronic markets have tried to devise methods to counteract the damaging effect of them. However, conventional electronic trading systems are currently not designed to protect against cascades. Therefore, they quickly become overwhelmed, offering limited protection in the event of there being a large number of market orders being submitted to the market. Its only when the market orders diminish in volume that the electronic trading systems eventually brings the cascade to a stop. It is worth noting that statistically, the overwhelming majority of cascades result in market prices falling, although the potential exists for cascades to create significant upward price movements as well.

Figure 4:
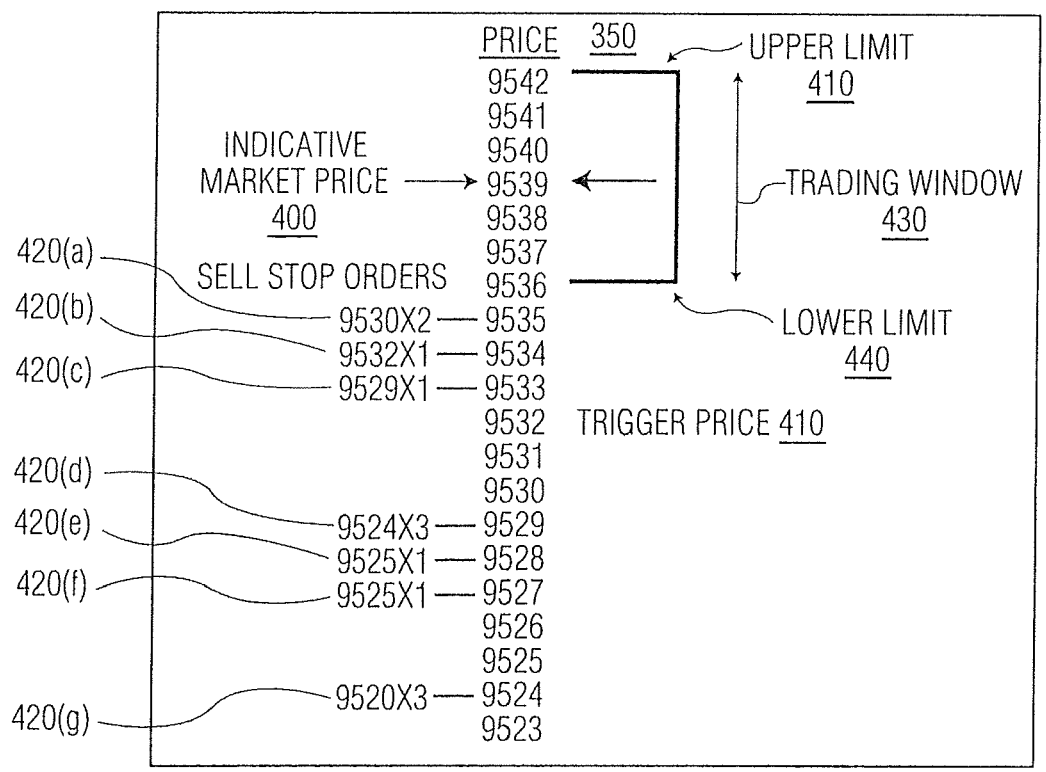
FIGS. 4-5 illustrate a cascade movement of prices caused by stop loss orders in an electronic trading system.
Figure 5:
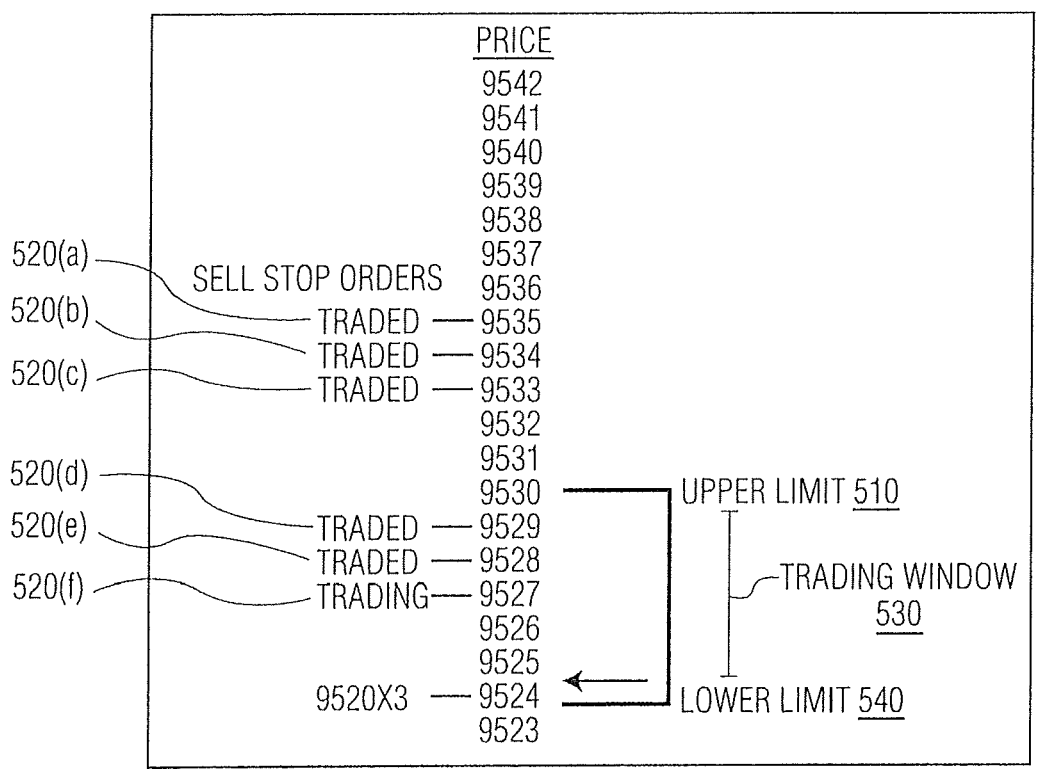

FIG. 4 shows multiple stop orders 420 placed by traders that haven't been executed. As the sell orders arrive they push the IMP down to the lower limit level 440 shown in FIG. 4 at price value 9536. This in turn re-adjusts the price limits lower, this allows for one or more waiting stop orders 420 to be triggered and sent into the market once the trigger price has been traded or breached, again pushing the market lower and so on. FIG. 5 shows the stop orders 520 after they have been executed as the IMP is pushed down. The spiking price limits mechanism described herein helps control a cascade price movement by adjusting the upper and lower limits appropriately as the IMP changes thereby favoring market price movement in a direction against the cascade price movement direction and discouraging market price movement in the direction of the cascade price movement. The size of the gap between a limit (upper or lower limit) and the IMP value determines the ability of the IMP to move in the direction of the corresponding limit. For example, a large gap between the IMP and the upper limit allows larger price movements upwards. Similarly, a small gap between the IMP and the lower limit restricts the price movements downwards. A combination of a large gap between the IMP and the upper limit and a small gap between the IMP and the lower price limit achieves the combined goal of restricting downwards price movements and encouraging larger upward price movements. As a result the downward cascade price movement is slowed down. The same concept can be applied in reverse to slow down upward price cascades.

Spiking Price Limits

A normal price limits mechanism operates using a set of parameters (i.e., the number of ticks either side of the IMP). While the number of ticks can be adjusted, this is a manual operation and one that therefore will take time, albeit seconds, to undertake. In one embodiment, a spiking price limit mechanism automatically adjusts to market conditions. The spiking price limits mechanism applies a breaking motion in the direction of the cascade and at the same time increases the size of the price limit window to allow counter orders into the market. In one embodiment, the spiking price limits mechanism is configured as computer program instructions 124 (software), stored in the memory 104 and/or the machine readable unit 122 in the storage unit 116 and executable by the processor 102.

In some embodiments, the spiking price limits mechanism can be configured to stop a cascade after certain criteria have been met. The spiking price limits configurable variables include: (1) Time T: the time interval within which the same price limit must be hit multiple times by the IMP in order to engage the spiking price limits mechanism; (2) Price limit L: the gap between a price limit and the IMP in terms of ticks when the normal price limits mechanism is engaged maintaining equal gap between upper limit and the IMP and the lower limit and the IMP; (3) Price limit hit count H: the number of times a price limit must be hit within the time interval T in order to engage spiking price limits mechanism; (4) Tick reduction rate R: the rate with which the gap between the limit (upper or lower limit) being hit multiple times and IMP is reduced whenever the limit is hit, assuming spiking price limits is engaged.

During normal market conditions the electronic trading system 200 operates by incorporating price limits as described above in FIG. 3. Accordingly, the gap between the upper limit 310 and the IMP 300 is maintained at the same value or within a predetermined range of the gap between the IMP 300 and the lower limit 340. In the scenario described below, the market is going down although the same principles would apply in reverse if the market was going up.

FIG. 6 illustrates a scenario in which a large order arrives in the market with the price levels as shown in FIG. 4. As a result, the IMP is pushed down from 9539 to 9536 (the lower limit 440). As the lower limit 440 has been hit, the price limit manager 250 starts a timer which will measure the time between the first hit and the next possible hit on the lower limit. The timer is both configurable from thousandths of a second to minutes. The timer acts as the switch that turns the spiking price limits mechanism on. The limits reset to reflect the move as shown in FIG. 6. As shown in FIG. 6, the upper limit 610 is reset to the price value 9539 and the lower limit 640 is reset to the price value 9533.

If the timer is set to 2 seconds and the lower limit is hit again within 2 seconds of the first hit, the price limit manager 250 engages the spiking price limits mechanism. If the lower limits are not hit within 2 seconds of the first hit it will go back to standby and normal mode. Not only is the time (2 seconds) configurable but also the number of hits on the limit before the spiking price limits function engages. It could be conceived that in a particularly volatile contract the price limit manager 250 should be configured such that the spiking price limits is not engaged until a limit has been hit a number of times. For example, some commodities markets are inherently volatile and the parameters of the spiking price limits mechanism are appropriately set so as to avoid false triggering of the spiking price limits mechanism when there is no cascade price movement. In another embodiment, an automatic adaptive mechanism measures the volatility of the market price based on price movements measured over a period of time. Based on the measured volatility of the market, the parameters of the spiking price limits mechanism as automatically adjusted. For example, during certain times of the day the market may be more volatile compared to other times of the day. The market volatility is measured automatically and used to adjust the configuration parameters of the spiking price limits in an ongoing basis.

If a second large order arrives hitting the lower limit 640 at the price value of 9533 again within 2 seconds, the spiking price limits mechanism is triggered. In some embodiments, an alert is sent to the system administrator 220 with information that spiking price limits mechanism has been engaged. The alert can be auditory, visual, or tactile. In an embodiment, an automatic connection is established between the administration user interface 240 and the electronic trading system 200 in order to allow a system administrator to view the configuration parameters associated with the spiking price limits. The system administrator may provide manual input in order to change the configuration parameters associated with the spiking price limits mechanism based on criteria that may be difficult to detect automatically.

Because the spiking price limit parameters are configurable, there are a number of controlled scenarios that can happen at this point. In the scenario illustrated in FIGS. 6-9, assume the values of the configurable parameters as: (1) Time T=2 seconds; (2) Price limit L=3 ticks; (3) Price Limit hit count H=once; (4) Tick reduction rate R=none.

As shown in FIG. 7, the IMP 730 adjusts again down to the new price of 9533. However, as shown in FIG. 7, the upper limit 710 stays where it is at 9539 although the lower limit 740 is adjusted to a lower value of 9530 that is L=3 ticks below the IMP 730. This widens the trading window to give traders who wish to enter buy orders more flexibility and time to get their orders into the market before it moves again. In another embodiment, the upper limit 710 can also be adjusted so long as the gap between the upper limit 710 and the IMP is maintained to be larger than the gap between the lower limit and the IMP. Keeping the gap between the upper limit and the IMP larger than the gap between the lower limit and the IMP encourages price movement going upwards by encouraging orders above the IMP and discouraging orders below the IMP.

The spiking price limits will continue to track the market up and down following the IMP. The trading window will not automatically widen anymore than the current 10 ticks in this scenario. In an embodiment, the spiking price limits can be reverted back to normal mode upon detection of positive signs that the price has started moving upwards and the price cascade movement downwards has ended. In another embodiment, the spiking price limits can be reverted back to normal mode by a manual action performed by the system administrator 220.

In an embodiment, the configurable parameter of the spiking price limits called the tick reduction rate R provides further control over the market. Assume that the configuration parameters are changed as follows: (1) Time T=2 seconds; (2) Price limit L=3 ticks; (3) Price Limit hit count H=once; (4) Tick reduction rate R=1. Accordingly, if the system administrator 220 changes the configuration parameter called tick reduction rate R manually to 1, each time the lower limit is hit after the spiking price limits have been engaged, the gap between the lower limit and the IMP is reduced by R=1 tick.

FIG. 8 shows that the gap between the lower limit 840 and the IMP 830 is reduced by 1 tick in relation to the gap shown in FIG. 7 between lower limit 740 and IMP 730. In FIG. 8 the lower limit 840 is only 2 ticks below the IMP at a price value of 9528 whereas in FIG. 7, the lower limit 740 is 3 ticks below the IMP 730. Furthermore, in FIG. 8, the upper limit 810 is 6 ticks above the IMP (9530) at a price value of 9536. This causes a slowing or a breaking effect on a falling market. If the above scenario is continued and the lower limit is hit twice more, the lower limit 940 and the IMP 930 become the same at the price value 9526 as shown in FIG. 9. The parameters H and T provide a mechanism to control the rate at which the gap between the lower limit 840 and IMP 830 is reduced. In an embodiment, the parameter H is used exclusively to engage the spiking price limits and another parameter used to determine the rate at which the gap between the lower limit 840 and IMP 830 is reduced.

The reduction of the gap between the lower limit 840 and the IMP 830 until the lower limit 940 becomes the same as the IMP 930 has the effect of producing a support level in the market, a point at which the market cannot trade below. As trades cannot occur outside of the lower limit 940 and because all of the lower ticks have been used up by the tick reduction rate, the cascade has been stopped. The only way the market price can continue to fall is if the system administrator 220 manually resets the spiking price limits to normal mode.

Figure 10:
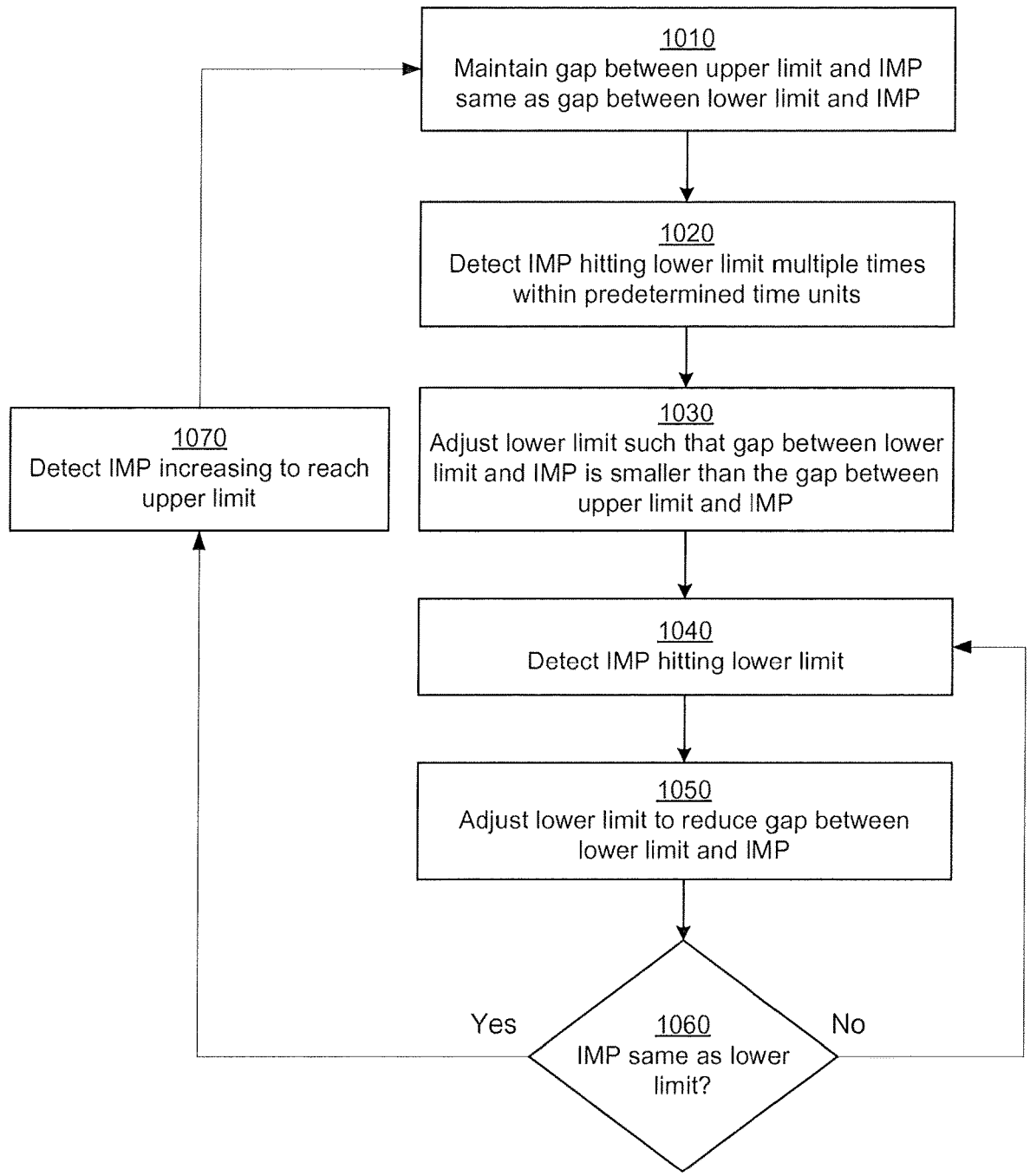
FIG. 10 shows a flowchart of one embodiment of a process for controlling falling prices in a cascade price movement in an electronic trading system.

FIG. 10 shows a flowchart illustrating the steps of spiking price limits method for controlling falling prices in a cascade price movement. The pricing limits mechanism maintains two limits, an upper limit and a lower limit. Initially the normal pricing limits mechanism is engaged such that the gap between the upper limit and the IMP is same as the gap between the lower limit and the IMP, for example, both gaps are G ticks. In an embodiment the gap between the upper limit and the IMP can be within a predetermined value of the gap between the lower limit and the IMP, allowing the two values to defer by a predetermined value. Accordingly, the two gaps do not have to be the exact same but can be within a range of each other.

The price limit manager 250 of the electronic trading system 200 detects 1020 that the IMP hits the lower limit a predetermined number of times within a given time interval. This causes spiking price limits to be engaged. Accordingly, the upper and lower limits are adjusted 1030 such that the gap between the lower limit and the IMP is less than the gap between the upper limit and the IMP. In an embodiment, this is accomplished by leaving the upper limit at the previous upper limit value and adjusting the lower limit such that the gap between the lower limit and the IMP remains unchanged. Since the price has moved down, this results in larger gap between the upper limit and IMP compared to the gap between lower limit and the IMP. In alternative embodiments, the upper limit may be changed to a different price, so long as the gap between the upper limit and IMP is greater than the gap between the lower limit and IMP.

The subsequent steps 1040, 1050, and 1060 can be repeated multiple times, each iteration resulting in reducing the gap between the lower limit and the IMP. The rate at which the gap between the lower limit at the IMP is reduced controls the rate at which the fall of prices due to the cascade movement is slowed down until it stops. Each time the IMP is detected 1040 hitting the lower limit, the lower limit is adjusted 1050 such that the gap G between the lower limit and the IMP value is reduced. A check 1060 is performed to see if the IMP value is same as the lower limit. If the two values are different, the lower limit is adjusted again if the IMP is detected 1040 hitting the first limit, further reducing the gap between the lower limit and the IMP. If the lower limit value becomes same as the IMP value causing the gap between them to be zero, the lower limit value is not adjusted further based on the spiking price limits. Instead, the price limit manager 250 waits for the IMP to increase. In an embodiment, if the IMP value is detected 1070 as increasing and reaching the upper limit, the spiking price limits mechanism is disengaged. Subsequently, the normal pricing limits mechanism that maintains 1010 same gap between the lower limit and IMP as the gap between the upper limit and IMP. In another embodiment, the spiking price limits mechanism is disengaged when the IMP increases by a predetermined value. In another embodiment, the spiking price limits mechanism is disengaged when the IMP increases by a predetermined fraction of the gap between the upper limit and the IMP.

Figure 11:
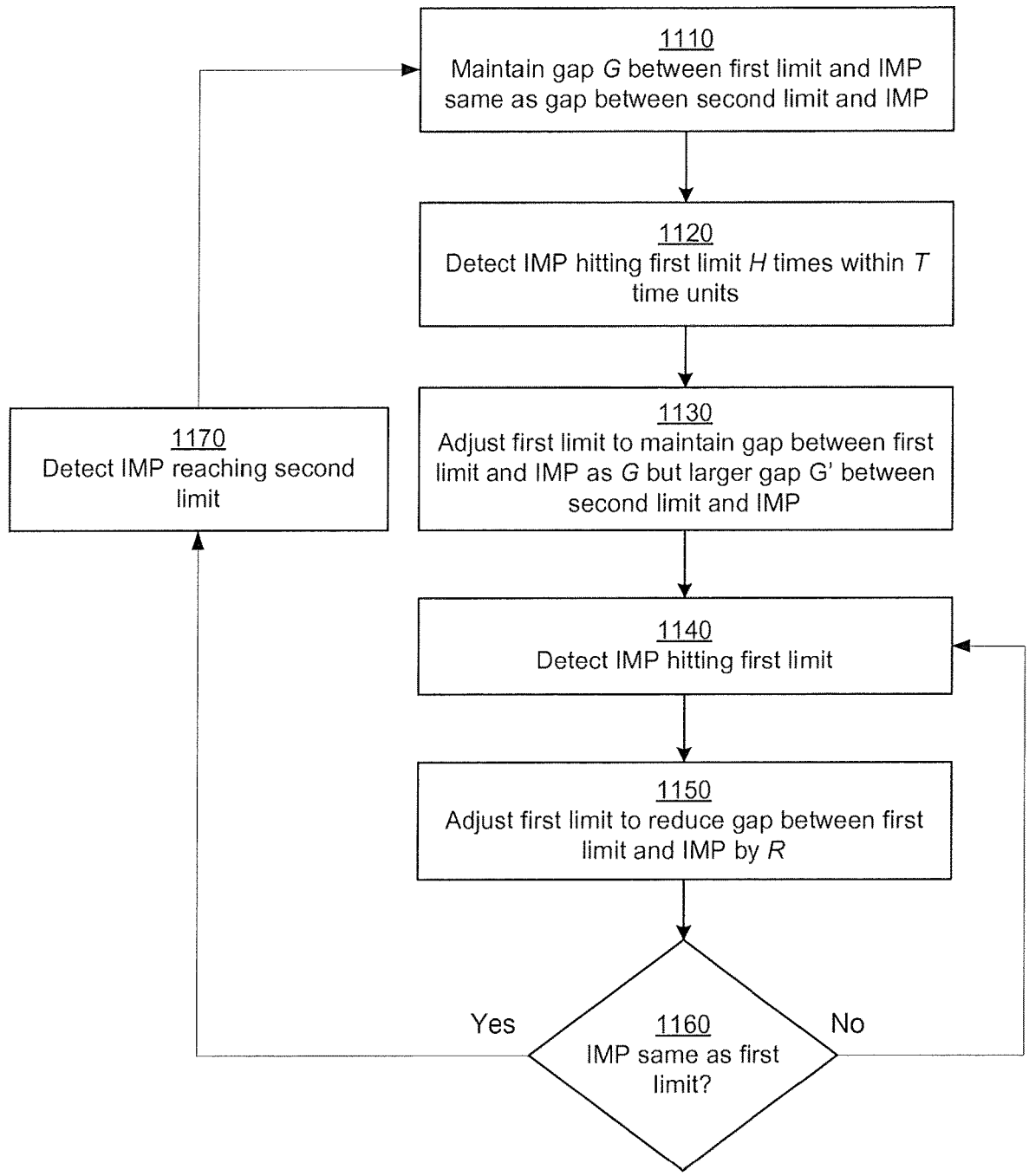
FIG. 11 shows a flowchart of one embodiment of a process for controlling cascade price movements in an electronic trading system.

The process illustrated using the flowchart described in FIG. 10 can be appropriately modified to control cascade price movements causing market price to rise. FIG. 11 shows the overall flowchart illustrating the steps of spiking price limits method for controlling a cascade price movement in a manner independent of the direction of the price movements. The pricing limits mechanism maintains two limits, called a first limit and a second limit. Depending on a scenario, the first limit can be the upper limit and the second limit can be the lower limit or the first limit can be the lower limit and the second limit can be the upper limit. Initially the normal pricing limits mechanism is engaged such that the gap between the first limit and the IMP is same as the gap between the second limit and the IMP, for example, both gaps are G ticks. In an embodiment the gap between the first limit and the IMP can be within a predetermined value of the gap between the second limit and the IMP, allowing the two values to defer by a predetermined value. Accordingly, the two gaps do not have to be the exact same but can defer by a small predetermined value.

The price limit manager 250 of the electronic trading system 200 detects 1120 that the IMP hits the first limit H times within a time interval T time units. The IMP hits a first/second limit when a change in the IMP value causes IMP to be the same as a first/second limit value. As described above, H and T are configurable parameters that can be changed by the system administrator 220. This causes spiking price limits to be engaged. Accordingly, the first limit is adjusted 1130 to maintain the same gap with IMP as before, which was G. However the gap between the second limit and the IMP has a value G', such that G'>G. In one embodiment, the second limit is maintained at the same price value as before the adjustment of the first limit. In alternative embodiments, the second price limit may also be adjusted so long as the gap G' between the second limit and IMP is kept at a value greater that the gap G between the first limit and the IMP. Maintaining a G' between the second limit and the IMP that is greater than the gap G between the first limit and the IMP increases the possibility of the market price moving towards the second limit and reduces the possibility to the market price to keep moving towards the first limit.

The steps 1140, 1150, and 1160 cause the reduction of the gap between the first limit and the IMP each time the IMP subsequently hits the first limit. The rate at which the gap between the first limit at the IMP is reduced controls the rate at which the cascade price movement is slowed down until it stops. Hence, the parameters H and T can be used to control the rate at which the cascade price movement is slowed down. Each time the IMP is detected 1140 hitting the first limit, the first limit is adjusted 1150 such that the gap G between the first limit and the IMP value is reduced by R unit values, for example ticks. A check 1160 is performed to see if the IMP value is same as the first limit value. If the two values are different, the gap between the first limit and the IMP value can be further adjusted 1150, if the IMP is detected 1140 hitting the first limit again. If the first limit value is same as the IMP value causing the gap between them to be zero, the first limit value is not adjusted further based on the spiking price limits. Instead, the price limit manager 250 waits for the IMP to move towards the second price limit. In an embodiment, if the IMP value is detected 1170 as reaching the second price limit, the spiking price limits mechanism is disengaged and the normal pricing limits mechanism that maintains 1110 same gap between the first limit and IMP as the gap between the second limit and IMP. In another embodiment, the spiking price limits mechanism is disengaged when the IMP moves a predetermined value towards the second limit. In another embodiments, the spiking price limits mechanism is disengaged when the IMP moves by a value that is a predetermined fraction of the gap G' between the second limit and the IMP.

An advantage of the disclosed configuration is to provide an ability to control cascade movements of prices markets based on in electronic trading. Parameters are provided that allow ability to slow down and even stop cascade price movements in a particular direction in the market. Configuration parameters associated with the spiking price limits allow the ability to control when the spiking price limits mechanism is engaged based on the type of market, for example, slow moving or highly volatile market. Configuration parameters associated with the spiking price limits mechanism can also be adjusted to control the rate at which the cascade price movement is slowed down.

Fixed Price Limits

Figure 12:
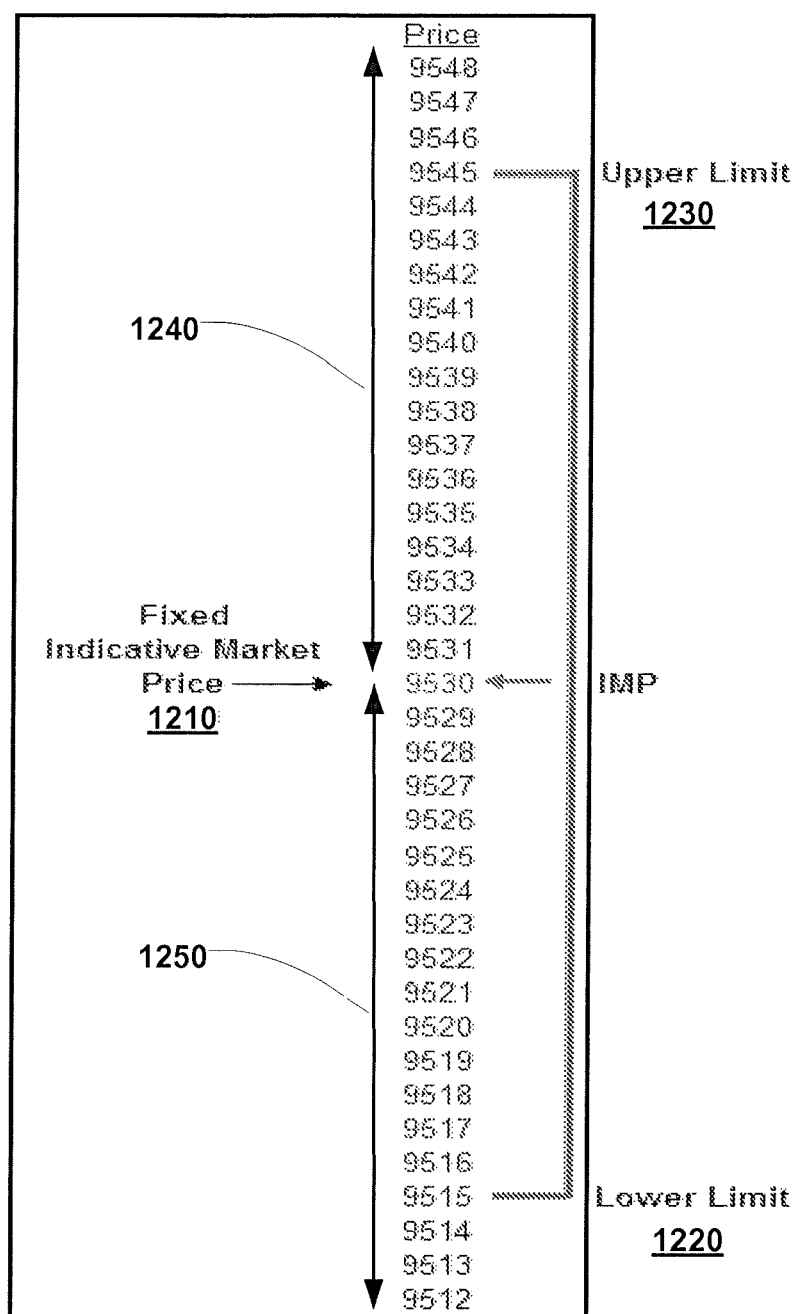
FIG. 12 illustrates an embodiment of a fixed price limits mechanism for controlling cascade price movements in an electronic trading system.

FIG. 12 illustrates an embodiment that enforces fixed price limits to control cascade price movements in markets based on electronic trading. The spiking price limits mechanism tracks the market price during a trading session. The upper and lower limits in the spiking price limits mechanism can change each time the indicative market price changes due to events in the market. The fixed price limits mechanism sets fixed price limits for a given time interval, thereby setting a trading price limit range for the time interval. The fixed price limits are not changed with any market events in the fixed time interval, unlike the spiking price limits mechanism. The fixed price limits are enforced during the fixed time interval by disallowing trading outside the fixed price limits. At the end of the fixed time interval, new price limits may be determined for the next time interval. A fixed time interval could be an hour long, several minutes long, or an entire trading session.

The example in FIG. 12 shows a fixed indicative market price 1210 of 9530 for the fixed time interval and the price limits are set to 15 ticks above 1240 and below 1250 the fixed indicative market price 1210. The fixed time interval can be associated with an upper limit 1230 and a lower limit 1220. This sets the trading range to be between 9515 and 9545 and the orders accepted must lie within these limits. Accordingly, the market cannot be bid above 9545 or offered below 9515 as these orders fall outside the fixed price limits and will be rejected. The fixed indicative market price 1210 as well as the upper limit 1230 and the lower limit 1220 stay constant during the fixed time interval irrespective of the market events.

A downward cascade price movement stops when it reaches the lower limit since trading below the lower limit is not allowed. Similarly, an upward price cascade movement stops at the upper limit since trading is not allowed above the upper limit. In either case, if the market hits a price limit due to a cascade price movement, the market can either stay at the limit price or move in the direction opposite to the price cascade movement. This causes the price cascade movement to stop.

In an embodiment, the system administrator can manually enter a fixed indicative market price 1210 along with the range of price limits 1240, 1250 in terms of ticks to create a trading window. This trading window does not change during the time interval until either the fixed indicative market price 1210 is manually changed or the range of price limits in terms of ticks 1240, 1250 is manually changed. A system administrator may set the fixed indicative market price 1210 and range of price limits in terms of ticks 1240, 1250 for the next time interval. Alternatively, the system administrator can directly provide the values of the upper limit and the lower limit for enforcing fixed price limits for a time interval.

In an embodiment, the price limits manager 250 automatically determines the fixed price limits based on dynamic information gathered from the system, for example, statistical information from previous sessions. The price limits manager 250 can also consider factors including policies enforced by specific markets. When the time interval for which fixed price limits are enforced ends, price limits manager 250 automatically determines the fixed price limits for the next time interval. The price limits manager 250 may use information gathered during the previous time interval to determine the price limits for a time interval, for example, volatility of the market during the previous window or the overall range of price movement in the previous time interval.

In one embodiment the size of the time interval is determined based on statistical information associated with previous time intervals. For example, the size of the time interval associated with fixed price limits can be larger if the market is less volatile but smaller if the market is determined to be very volatile. Accordingly the trading range of the markets can be adjusted based on the volatility.

The fast speed at which price can move during cascade price movements is from the use of electronic trading systems. An electronic trading system allows a chain of trades to be executed in rapid succession, each trade causing the price to change in the same direction resulting in a very large price change in a very short time interval. This rapid speed of price movement is unlikely to occur in a market based on manual trading techniques and toots, In a market based on manual trading techniques and tools, trades are unlikely to be executed in a very short time interval and manual intervention may be sufficient to control the price movements if necessary. Hence the disclosed configurations and processes allows for real time control of fast price movements that can occur in electronic trading markets that are possible due to the fast speed at which electronic markets are capable of trading. Specifically, the disclosed configurations and processes analyze, adjust and apply corrections to market prices reflective of tangible, real-work commodities that are bought and traded on electronic exchanges, which themselves are configured to reflect tangible real world exchange value of the commodities.

In addition, disclosed configuration beneficially and advantageously provides a computer implemented process for controlling cascade price movements in a market based in an electronic trading system. The rapid changes in the market price during a cascade price movement make it impractical to rely on manual intervention tools or techniques to control the market. As noted previously, a price cascade movement in an electronic system can change prices by large amounts in a very short time interval (of the order of milliseconds), manual reaction time cannot allow to take appropriate action in real time. Moreover, such techniques as noted above can slow down electronic trading system causing even further problems. The disclosed computer implemented methods and systems beneficially and advantageously, monitor, analyze and take corrective action on rapid price movements in real time in such trading systems allowing for greater overall systemic integrity. Even though the market is based on an electronic trading system, the market prices are reflective of tangible, real world entities that are directly affected, for example, prices of commodities in real world.

Additional Configuration Considerations

Throughout this specification, plural instances may implement components, operations, or structures described as a single instance. Although individual operations of one or more methods are illustrated and described as separate operations, e.g., the descriptions of FIGS. 3-11, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules, for example, as described with the processes corresponding to the descriptions of FIGS. 3-9 or the process described in FIGS. 10-11. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations, Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm), In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities, Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for controlling price cascades in electronic trading systems through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method comprising:
   in a system comprising one or more processors executing computer program instructions, said computer program instructions defining a spiking price limit mechanism:
   monitoring, by the one or more processors, market information of a trading market, the market information comprises an indicative market price (IMP);
   initializing, by the one or more processors, an initial interval comprising a first price limit and a second price limit, the initial interval having a first gap between the IMP and the first price limit and a second gap between the IMP and the second price limit, the initial interval configured such that a value of the first gap is equal to a value of the second gap;
   detecting, by the one or more processors, a change in the market information that is indicative of a price cascade, wherein the change comprises detecting the IMP hitting the first price limit a predetermined number of times within a predetermined time period;
   engaging, by the one or more processors, the spiking price limit mechanism, responsive to the detected change, the spiking price limit mechanism comprising one or more configuration parameters for controlling the price cascade;
   applying, by the spiking price limit mechanism, a breaking motion in a direction of the price cascade by:
   repeatedly adjusting the first price limit each time the IMP hits the first price limit, to incrementally reduce the value of the first gap in the direction of the price cascade until the value of the first gap reaches zero, while continually monitoring the market information, wherein the one or more configuration parameters automatically control a rate at which the price cascade is electronically slowed down; and
   disengaging the spiking price limit mechanism once the one or more processors determine that the value of the first gap in the direction of the price cascade reaches zero and the IMP is detected as reaching the second price limit.

2. The method of claim 1, wherein the detecting further comprises:
   determining, by the one or more processors, that at least one of the following criteria has been met:
   the IMP equals the first price limit multiple times within the predetermined time period;
   the value of the first gap exceeds a predetermined value; and
   a rate at which the value of the first gap is reduced in response to the IMP equaling at least one of the first price limit and the second price limit.

3. The method of claim 1, wherein applying the breaking motion in the direction of the price cascade comprises:
   adjusting both the first price limit and the second price limit such that the value of the first gap in the direction of the price cascade is smaller than the value of the second gap in a direction opposite that of the price cascade.

4. The method of claim 1, wherein applying the breaking motion in the direction of the price cascade comprises:
   adjusting the first price limit without adjusting the second price limit.

5. The method of claim 1, further comprising:
   measuring, by the one or more processors, a volatility of the trading market; and
   generating, by the one or more processors, one or more new configuration parameters for controlling subsequent price cascades based on the measured volatility, the one or more new configuration parameters based on one or more of historical market data and real-time market data for one or more financial instruments.

6. The method of claim 5, wherein the one or more new configuration parameters are further based on a plurality of determined market reactions and a plurality of historical market data.

7. The method of claim 5, wherein generating the one or more new configuration parameters comprises selecting the one or more new configuration parameters to reduce acceptance of orders following execution of a trade.

8. The method of claim 5, wherein generating the one or more new configuration parameters comprises selecting the one or more new configuration parameters to reduce an impact of a market reaction following execution of a trade.

9. The method of claim 1 the method further comprising:
   establishing a new first price limit and a new second price limit having the first gap equal to the second gap, responsive to disengaging the spiking price limit mechanism.

10. The method of claim 1, wherein initializing the initial interval comprises determining the first price limit and the second price limit based on the one or more configuration parameters.

11. The method of claim 1, wherein the first price limit comprises an upper price limit and the second price limit comprises a lower price limit.

12. The method of claim 1, wherein the first price limit comprises a lower price limit and the second price limit comprises an upper price limit.

13. The method of claim 1, wherein the one or more configuration parameters comprise a time interval.

14. The method of claim 1, wherein the one or more configuration parameters comprise an order price.

15. The method of claim 1, wherein the one or more configuration parameters comprise a price limit hit count.

16. The method of claim 1, wherein the one or more configuration parameters comprise a tick reduction rate.

17. The method of claim 1, further comprising:
   determining, by the one or more processors, whether to execute or reject an order based on one or more of the first price limit and the second price limit.

18. The method of claim 1, further comprising:
   establishing, by the one or more processors, an automatic connection to a user interface;
   receiving, by the one or more processors, input via the user interface, said input comprising an adjustment to the one or more configuration parameters; and
   initializing, by the one or more processors, a subsequent interval to prevent a subsequent price cascade, the subsequent interval comprising a new first price limit and a new second price limit generated in accordance with the adjustment to the one or more configuration parameters.

* * * * *